United States Patent
Hambloch

(10) Patent No.: US 12,043,303 B2
(45) Date of Patent: Jul. 23, 2024

(54) STEERING COLUMN ASSEMBLY, AND MOTOR VEHICLE WITH A STEERING COLUMN ASSEMBLY

(71) Applicant: ZF Automotive Germany GmbH, Alfdorf (DE)

(72) Inventor: Peter Hambloch, Krefeld (DE)

(73) Assignee: ZF AUTOMOTIVE GERMANY GMBH, Alfdorf, NY (US)

( * ) Notice: Subject to any disclaimer, the term of this patent is extended or adjusted under 35 U.S.C. 154(b) by 0 days.

(21) Appl. No.: 18/074,858

(22) Filed: Dec. 5, 2022

(65) Prior Publication Data

US 2023/0174138 A1    Jun. 8, 2023

(30) Foreign Application Priority Data

Dec. 7, 2021  (DE) .......................... 102021213907.8

(51) Int. Cl.
*B62D 1/181* (2006.01)
*B62D 1/189* (2006.01)

(52) U.S. Cl.
CPC ............ *B62D 1/181* (2013.01); *B62D 1/189* (2013.01)

(58) Field of Classification Search
CPC ..................................................... B62D 1/181
See application file for complete search history.

(56) References Cited

U.S. PATENT DOCUMENTS

| 2018/0370559 A1* | 12/2018 | Swamidason | .......... | B62D 1/181 |
| 2019/0016365 A1* | 1/2019 | Swamidason | .......... | B62D 1/185 |

FOREIGN PATENT DOCUMENTS

| DE | 4230664 A1 | | 3/1994 | | |
| DE | 102006006332 A1 | * | 8/2007 | ........... | B62D 5/0424 |
| DE | 102008009293 A1 | * | 8/2009 | ........... | B62D 5/0409 |
| DE | 102018219314 A1 | * | 5/2020 | | |
| DE | 102019209114 A1 | * | 12/2020 | | |
| DE | 102019209114 A1 | | 12/2020 | | |
| DE | 102021201640 A1 | * | 8/2022 | | |
| DE | 102021212522 A1 | * | 5/2023 | | |
| DE | 102021131350 A1 | * | 6/2023 | | |
| EP | 4177132 A1 | * | 5/2023 | | |
| JP | 2007083809 A | | 4/2007 | | |
| WO | WO-2007110054 A2 | * | 10/2007 | ............. | B62D 1/105 |
| WO | WO-2014124224 A1 | * | 8/2014 | ......... | B60R 16/0373 |
| WO | WO-2020127470 A1 | * | 6/2020 | ........... | B62D 5/0403 |
| WO | WO-2021099599 A1 | * | 5/2021 | ............. | B62D 1/181 |

* cited by examiner

*Primary Examiner* — Nicole T Verley
(74) *Attorney, Agent, or Firm* — Kristin L. Murphy

(57) ABSTRACT

A steering column assembly for a motor vehicle has a bearing housing and a steering shaft which is mounted in the bearing housing, and an adjusting apparatus, by which the steering shaft can be adjusted. The adjusting apparatus has a drive with a drive element, a motor with a drive shaft, and a first flexible guide element which runs in a tensioned manner in a first tensioning direction between two first tensioning points. Here, furthermore, the drive element is wrapped around at least once without play by the first guide element and is coupled to it in a torque-transmitting manner such that the drive moves along the first guide element in or counter to the first tensioning direction when the drive shaft rotates in or counter to a rotational direction. Furthermore, a motor vehicle with a steering column assembly of this type is provided.

16 Claims, 3 Drawing Sheets

STEERING COLUMN ASSEMBLY, AND MOTOR VEHICLE WITH A STEERING COLUMN ASSEMBLY

CROSS-REFERENCE TO RELATED APPLICATION

This application claims priority to German Priority Application No. 102021213907.8, filed Dec. 7, 2021, the disclosure of which is incorporated herein by reference in its entirety.

TECHNICAL FIELD

The disclosure relates to a steering column assembly for a motor vehicle, with a bearing housing and a steering shaft which is mounted rotatably in the bearing housing, and with an adjusting apparatus, by which the steering shaft can be adjusted relative to a body of the motor vehicle by the driver for individual adaptation to the said driver. Furthermore, the disclosure relates to a motor vehicle with a body and a steering column assembly of this type.

BACKGROUND

Steering column assemblies for motor vehicles and motor vehicles with a steering column assembly are known.

A steering column assembly usually has a bearing housing, in which the steering shaft with the steering wheel is mounted rotatably, and an adjusting apparatus, by which the steering shaft can be adjusted relative to the body of the motor vehicle, in order to adapt the position and/or orientation of the steering wheel in respect of spacing and inclination individually to the driver.

In order to increase the comfort, modern steering column assemblies have a motor which drives and therefore adjusts the adjusting apparatus via a gear mechanism. Here, threaded spindles are used, in order to transform the torque of the motor into a corresponding adjusting movement of the steering shaft and/or the steering wheel.

Gear mechanisms with threaded spindles require high rotational speeds, in order to make rapid and therefore comfortable setting of the steering wheel possible. Furthermore, due to manufacture, threaded spindles have a play in the toothing system. A gear mechanism with threaded spindles therefore has the disadvantage that the adjusting of the steering wheel is associated with a certain occurrence of noise which reduces the comfort for the vehicle occupants.

SUMMARY

The disclosure relates to a steering column assembly for a motor vehicle, with a bearing housing and a steering shaft which is mounted rotatably in the bearing housing, and with an adjusting apparatus, by which the steering shaft can be adjusted relative to a body of the motor vehicle by the driver for individual adaptation to the said driver. Here, the adjusting apparatus has a drive with a drive element and a motor with a drive shaft which forms the drive element or is coupled to the drive element in a torque-transmitting manner. Furthermore, the adjusting apparatus has a first flexible guide element which runs in a tensioned manner between two first tensioning points and extends in a first tensioning direction from one of the first tensioning points to the other first tensioning point. Here, the drive element is wrapped around at least once without play by the first guide element and is coupled to it in a torque-transmitting manner such that the drive moves along the first guide element in or counter to (depending on the drive direction) the first tensioning direction when the drive shaft rotates about its longitudinal axis in or counter to a rotational direction. Furthermore, the adjusting apparatus is coupled to the bearing housing in such a way that, driven by the rotating drive shaft, the steering shaft is pivoted about a pivot axis with respect to the body and/or is adjusted in the axial direction of the steering shaft with respect to the body.

It has been recognized that the drive element can be coupled substantially without play to the guide element as a result of being wrapped around it, and a rotation of the drive element leads to the drive moving in the tensioning direction relative to the guide element. In this way, the steering shaft can be adjusted with particularly low noise by the adjusting apparatus, in particular even at high adjusting speeds. Therefore, the steering column assembly is particularly smooth-running and comfortable.

Here, the guide element can be damped in, that is to say fastened, or deflected at the tensioning points, and therefore can be fastened at a distance from the corresponding tensioning points.

In an exemplary arrangement, the adjusting apparatus has a second flexible guide element, the second guide element running in a tensioned manner between two second tensioning points and extending in a second tensioning direction from one of the second tensioning points to the other second tensioning point. As a result, the adjusting apparatus has a second degree of freedom in the form of the second tensioning direction, by which the adjusting apparatus can be of more flexible design, in order to adjust the steering shaft with respect to the body.

Here, in an exemplary arrangement, the drive element can be wrapped around at least once without play by the second guide element and can be coupled to it in a torque-transmitting manner such that the drive moves along the second guide element in or counter to (depending on the drive direction) the second tensioning direction when the drive shaft rotates about its longitudinal axis in or counter to a rotational direction. In this way, the drive element is coupled both to the first and to the second guide element, with the result that a rotation of the drive element leads to a combined movement in the first and second tensioning direction. Therefore, the steering shaft can at the same time be pivoted about the pivot axis with respect to the body and can be adjusted in the axial direction of the steering shaft with respect to the body by way of a single drive element.

In an another exemplary arrangement, the adjusting apparatus has a second drive with a second drive element. The second drive has a second motor with a second drive shaft which forms the second drive element or is coupled to the second drive element in a torque-transmitting manner. Furthermore, the second drive element is wrapped around at least once without play by the second guide element and is coupled to it in a torque-transmitting manner such that the second drive moves along the second guide element in or counter to (depending on the drive direction) the second tensioning direction when the second drive shaft rotates about its longitudinal axis in or counter to a second rotational direction. This design has the advantage that two separate drives are provided, by which the adjusting apparatus can be adjusted. As a result, the adjusting apparatus can be designed in such a way that the steering shaft can be pivoted about the pivot axis with respect to the body by way of the one drive element, while, independently of this, the steering shaft can be adjusted in the axial direction with respect to the body by way of the other drive element.

It can be provided, furthermore, that the guide element or the guide elements is/are a cord, a wire, a cable, a strap, a belt or a ball chain. In this way, a reliable non-positive and/or positively locking transmission of torque between the guide element and the drive element can be ensured.

In the context of the present disclosure, a flexible guide element is to be understood to mean, in particular, a guide element which can be wound up and/or unwound. The flexible guide element can be guided or is guided in a direction transversely with respect to the tensioning direction of the guide element around the drive element in the form of at least one loop and/or at least one sling. In particular, the flexible guide element is stable in length and/or cannot be stretched and/or is unstretchable in the tensioning direction.

According to the disclosure, a motor vehicle with a body and a steering column assembly according to the disclosure with the abovementioned advantages is also provided in order to achieve the abovementioned object.

In an exemplary arrangement, the steering column assembly has a steering column joint, by which the bearing housing is attached to the body such that it can be pivoted about a pivot axis. This ensures that the bearing housing is fastened reliably to the body and can be pivoted with respect to the latter in a defined manner.

In addition or as an alternative, the first motor and/or the second motor can be attached to the bearing housing, as a result of which it or they is/are adjusted together with the bearing housing when the bearing housing pivots.

In a further exemplary arrangement, the first motor and/or the second motor are/is attached to the body, as a result of which it or they is/are fastened in a stationary manner in the motor vehicle.

In accordance with the exemplary arrangement, the first motor and/or the second motor are/is mounted such that they can be adjusted in the vertical direction with respect to the body. In particular, the steering column assembly has at least one supporting element which supports the first motor and/or the second motor in the vertical direction. By the motor or the motors being mounted with a degree of freedom with respect to the body, the adjusting apparatus can be of particularly flexible design, in particular in order to ensure that the motor or the motors can move along the respective associated guide element.

It can be provided, furthermore, that the two first tensioning points of the first guide element are attached to the body, the first tensioning direction, in particular, pointing in the vertical direction. In the context of the disclosure, the first tensioning direction points in the vertical direction if the first tensioning direction differs from the vertical direction by less than 45° or less than 10°, that is to say from the perpendicular direction, when the motor vehicle is standing on a horizontal plane ready for travelling. As a result, the bearing housing can be pivoted particularly efficiently about a pivot axis by the first guide element, since the adjusting travel of the drive element along the first guide element is particularly short.

In addition or as an alternative, the two second tensioning points of the second guide element can be attached to the bearing housing. Here, the bearing housing, in particular, has a first bearing portion and a second bearing portion which can be adjusted telescopically with respect to one another in the axial direction of the steering shaft, the second tensioning points being attached to the first bearing portion or to the second bearing portion. In this way, the steering shaft can be adjusted in the axial direction with respect to the body in a particularly efficient manner, since the adjusting travel of the drive element along the second guide element is particularly short.

In an exemplary arrangement, one of the second tensioning points of the second guide element is attached to the bearing housing, while the other second tensioning point is attached to the body. Therefore, the second guide element establishes a direct connection between the bearing housing and the body.

In a further exemplary arrangement, the steering column assembly has a first carrier, which has the first tensioning points of the first guide element, and/or a second carrier, which has the second tensioning points of the second guide element. Here, the steering column assembly has a first carrier joint, by which the first carrier is attached to the body or the bearing housing such that it can be pivoted about a pivot axis, and/or has a second carrier joint, by which the second carrier is attached to the body or the bearing housing such that it can be pivoted about a pivot axis. The adjusting apparatus can be of particularly effective design by the pivotably mounted carriers, since the tensioning direction of the guide elements can change with the adjustment of the steering shaft, in order to provide a particularly favourable drive direction and/or a particularly favourable adjusting travel for the associated drive in the case of every position and orientation of the steering shaft. The exemplary arrangement which is supplemented here by way of a carrier has advantages in the case of maintenance work on the motor vehicle because it is particularly suitable for dismantling and re-installation.

BRIEF DESCRIPTION OF DRAWINGS

Further advantages and features result from the following description and the appended drawings, in which.

DETAILED DESCRIPTION

Figure 1:
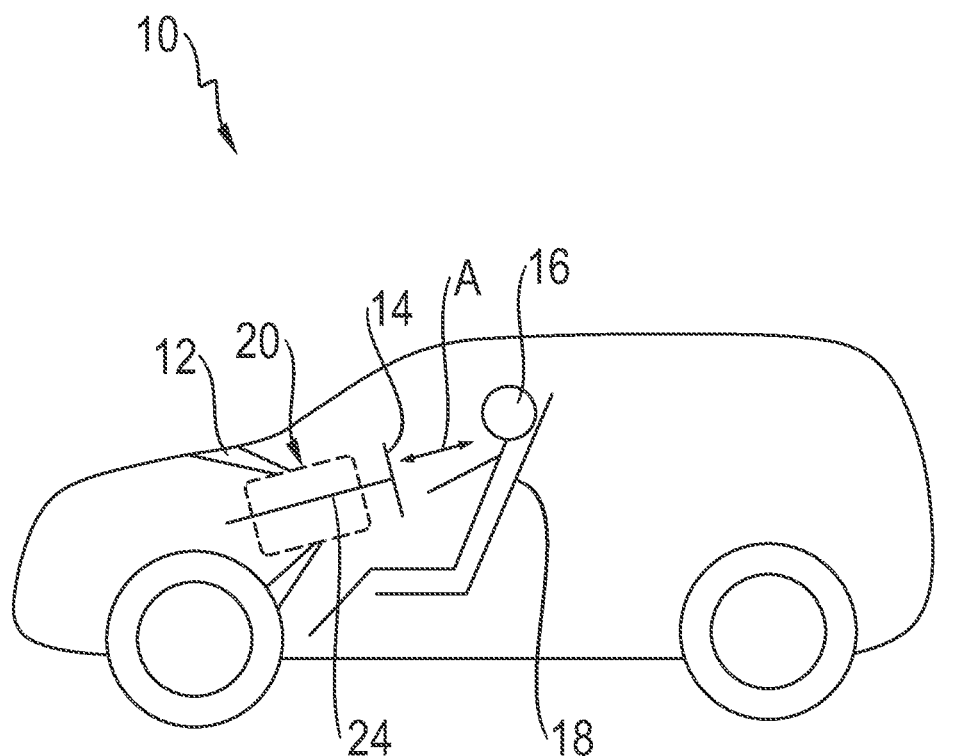
FIG. 1 shows a diagrammatic illustration of a motor vehicle according to the disclosure with a steering column assembly according to the disclosure.
Figure 1:
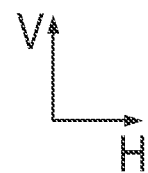

FIG. 1 shows a motor vehicle 10 with a steering column assembly 20.

The motor vehicle 10 is, for example, a passenger car, a lorry or a bus.

The steering column assembly 20 is attached to a body 12 of the motor vehicle 10 and is configured to position a steering wheel 14 with respect to a driver 16 who is seated on a driver's seat 18 of the motor vehicle 10.

To this end, the steering column assembly 20 has a bearing housing 22 (see FIG. 2), a steering shaft 24 and an adjusting apparatus 26, the construction and function of which will be explained in the following text.

The steering shaft 24 is mounted such that it can be rotated about its longitudinal axis L in the bearing housing 22 and is coupled to the steering wheel 14 in a torque-transmitting manner.

In this way, control inputs which are made by the driver 16 via a rotation of the steering wheel 14 are transmitted to the steering shaft 24 and can be transformed from the latter via a control apparatus into a corresponding steering movement of the motor vehicle 10, for example by steer-by-wire.

The bearing housing 22 is of telescopic design and has a first bearing portion 28 and a second bearing portion 30 which can be adjusted and are mounted such that they can be displaced with respect to one another in the axial direction A of the steering shaft 24.

As a result, the steering shaft 24 and therefore the steering wheel 14 can be adjusted in the axial direction A toward the driver's seat 18 or away from the latter, with the result that the spacing from the driver 16 can be set.

It is noted at this point that directions are indicated with a double arrow in the figures, in order to represent that a movement is possible both in and counter to the corresponding direction.

Furthermore, the adjusting apparatus 26 has a steering column joint 32 with a pivot axis $S_L$, by which steering column joint 32 the bearing housing 22 is fastened to the body 12 on the first bearing portion 28 such that it can be pivoted about the pivot axis $S_L$.

In this way, the steering shaft 24 and therefore the steering wheel 14 can be pivoted in the circumferential direction $U_L$ about the pivot axis $S_L$, as a result of which the orientation and/or the inclination of the steering shaft 24 with respect to the driver 16 can be set.

In order to adjust the steering shaft 24, the adjusting apparatus 26 has a drive 34, a first flexible guide element 36 and a second flexible guide element 38.

The first flexible guide element 36 and the second flexible guide element 38 are configured in each case in the form of a cord.

In another exemplary arrangement, the first flexible guide element 36 and/or the second flexible guide element 38 can be configured in the form of a wire, a cable, a strap, a belt or a ball chain.

It goes without saying that the first flexible guide element 36 and the second flexible guide element 38 can be configured identically to or differently from one another in all the exemplary arrangements.

The first flexible guide element 36 is clamped in a first tensioning direction 40 between two first tensioning points 42 which are spaced apart from one another and are attached here in each case to the body 12.

In the exemplary arrangement shown, the two first tensioning points 42 lie opposite one another in the vertical direction V, with the result that the first tensioning direction 40 points in the vertical direction V.

The second flexible guide element 38 is clamped in a second tensioning direction 40 between two second tensioning points 46 which are spaced apart from one another and are attached here in each case to the second bearing portion 30.

In the exemplary arrangement shown, the second tensioning direction 44 runs parallel to the longitudinal axis L of the steering shaft 24, with the result that the second tensioning direction 44 points in the axial direction A.

The drive 34 has a motor 48 with a drive shaft 50, and a drive element 52 which is coupled to the drive shaft 50 in a torque-transmitting manner.

The motor 48 is an electric motor here.

The drive element 52 is, for example, a drive disc, a drive wheel or a belt pulley.

In another exemplary arrangement, the drive shaft 50 forms the drive element 52; that is to say, no additional component is coupled to the drive shaft 50 in a torque-transmitting manner, in order to form the drive element 52.

In all the exemplary arrangements, the drive element 52 is coupled to the first flexible guide element 36 in a torque-transmitting manner, by the drive element 52 being wrapped around at least once in the circumferential direction without play by the first flexible guide element 36. Thus, the first flexible guide element 36 forms at least one loop, through which the drive element 52 extends and which bears without play against the drive element 52, with the result that the drive element 52 is connected to the first flexible guide element 36 in a torque-transmitting manner.

Here, the transmission of the torque takes place in a non-positive or frictionally locking manner.

In another exemplary arrangement, the transmission of the torque can take place in a non-positive and/or positively locking manner, depending on how the first flexible guide element 36 and the drive element 52 are designed.

In this way, the motor 48 is coupled to the first flexible guide element 36 such that the first flexible guide element 36 is wound on the drive element 52 on one side, that is to say towards one of the first tensioning points 42, and is unwound on the opposite side, that is to say towards the other first tensioning point 42, since the drive shaft 50 rotates. As a result, depending on the rotational direction of the drive shaft 50, the drive 34 moves along the first flexible guide element 36 in or counter to the first tensioning direction 40.

It is sufficient for this coupling that the drive element 52 is wrapped around once or with one loop by the first flexible guide element 36.

It goes without saying that, in another exemplary arrangement, the drive element 52 can be wrapped around multiple times (that is to say, with more than one loop) by the first flexible guide element 36, in particular in order to ensure that the drive element 52 is coupled reliably (in particular, without slip) to the first flexible guide element 36 in a torque-transmitting manner.

In the present exemplary arrangement, the drive element 52 is coupled in an analogous way to the second flexible guide element 38 in a torque-transmitting manner. Thus, the drive element 52 is wrapped around at least once without play by the second flexible guide element 38.

It goes without saying that, in another exemplary arrangement, the drive element 32 can be wrapped around multiple times (that is to say, with more than one loop) by the second flexible guide element 38.

In this way, the motor 48 is coupled to the second flexible guide element 38 such that, depending on the rotational direction of the drive shaft 50, the drive 34 moves along the second flexible guide element 38 in or counter to the second tensioning direction 44 when the drive shaft 50 rotates.

Here, the motor 48 is mounted such that it can be adjusted in the vertical direction V with respect to the body 12, while its position in the horizontal direction H with respect to the body 12 is fixed.

In order to support the drive 34 in the vertical direction V, the steering column assembly 20 in the case of this exemplary arrangement has a supporting element 54, on which the motor 48 rests and which loads the motor 48 with a force in the vertical direction V.

The supporting element 54 is, for example, a spring or a piston which is loaded with pressure.

In another exemplary arrangement, the supporting element 54 can be dispensed with. Here, the motor 48 is held by the two guide elements 36, 38.

In accordance with a further exemplary arrangement, the motor 48 can be supported on the bearing housing 22 or on a sliding element (not shown in greater detail here). As a result, a predefined spacing can be ensured between the motor 48 and the bearing housing 22. The sliding element can be arranged on the bearing housing 22 and can reduce the friction between the motor 48 and the bearing housing 22.

During operation of the steering column assembly 20, the coupling of the motor 48 to the first flexible guide element 36 leads to the steering shaft 24 pivoting about the pivot axis $S_L$ when the drive element 52 rotates, since, as a result, the bearing housing 22 is raised or lowered in the vertical direction V when the motor 48 moves along the first flexible guide element 36 in a first tensioning direction 40.

Furthermore, the coupling of the motor 48 to the second flexible guide element 38 leads to the steering shaft 24 being adjusted in the axial direction A when the drive element 52 rotates, since, as a result, the second bearing portion 30 together with the steering shaft 24 is displaced relative to the drive 34 in the second tensioning direction 44 when the motor 48 moves along the second flexible guide element 38 in the second tensioning direction 44.

The steering column joint 32 and the second tensioning points 46, at which the second flexible guide element 38 is coupled to the bearing housing 22, are attached here to different bearing portions 28, 30, in order to ensure the telescopic function of the bearing housing 22.

In the present exemplary arrangement, in which a single motor 48 with one drive element 52 is provided, the coupling of the drive element 52 both to the first flexible guide element 36 and to the second flexible guide element 38 leads to a combined adjusting movement when the drive element 52 rotates. Here, the combined adjusting movement consists in that the steering shaft 24 pivots upwards in the vertical direction V about the pivot axis $S_L$ and is adjusted in the axial direction A away from the driver's seat 18 when the drive element 52 is driven by the motor 48 in one direction, and that the steering shaft 24 is pivoted downwards counter to the vertical direction V about the pivot axis $S_L$ and is adjusted in the axial direction A towards the driver's seat 18 when the drive element 52 is driven by the motor 48 in the opposite direction.

Figure 5:
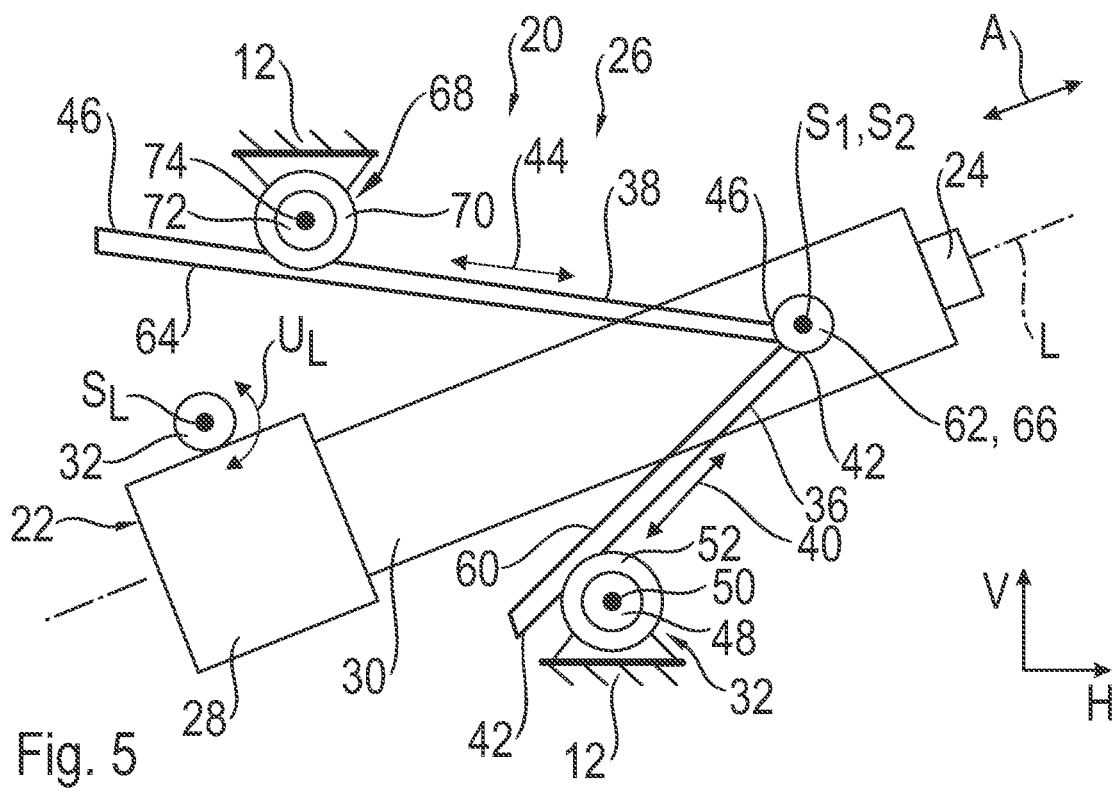
FIG. 5 shows a diagrammatic illustration of the steering column assembly from FIG. 1 in accordance with a further exemplary arrangement.

In order to decouple the adjusting movement about the pivot axis $S_L$ from the adjusting movement in the axial direction A, the adjusting apparatus 26 in another exemplary arrangement has a second drive, of analogous design to the first drive 34, with a second drive element (see also FIG. 5). Here, the two drives are coupled only to in each case one of the two flexible guide elements 36, 38, by the corresponding drive element of the drive being wrapped around by the associated flexible guide element 36, 38. For example, the first drive 34 is coupled to the first flexible guide element 36, and the second drive is coupled to the second flexible guide element 38.

In addition or as an alternative, the adjusting apparatus 26 can have a drive 34 with a first and a second drive element 52 which can be coupled in each case to the drive shaft 50, in order to drive the latter separately from one another and/or jointly.

In the exemplary arrangements, furthermore, the steering column assembly 20 can have further adjusting structures or adjusting devices, for example in the form of an adjusting arrangement, which correspondingly mount and guide the bearing housing 22, the steering shaft 24 and/or the adjusting apparatus 26 with respect to the body 12, in order to assist the function of the adjusting apparatus 26 in this way.

Furthermore, in another exemplary arrangement, the adjusting apparatus 26 can have merely one flexible guide element 36, 38, for example the first flexible guide element 36 or the second flexible guide element 38, in particular to adjust the steering shaft 24 by the flexible guide element 36, 38 with a correspondingly restricted functionality.

A steering column assembly 20 in accordance with a further exemplary arrangement will now be described on the basis of FIG. 3. The same reference numerals are used for the components which are known from the above exemplary arrangement, and to this extent reference is made to the preceding explanations.

Figure 2:
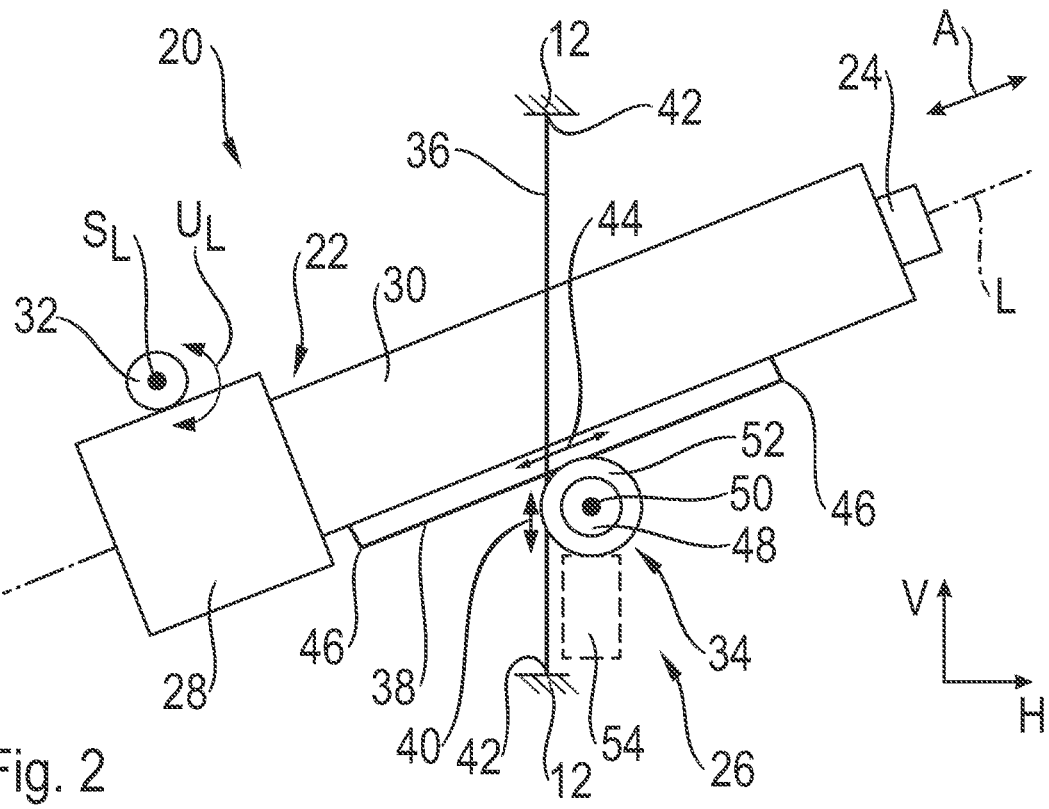
FIG. 2 shows a diagrammatic illustration of the steering column assembly from FIG. 1 in accordance with an exemplary arrangement.

In contrast to the exemplary arrangement shown in FIG. 2, the motor 48 is fastened here to the second bearing portion 30 of the bearing housing 22.

Furthermore, the first tensioning points 42 of the first flexible guide element 36 are connected to the body 12 in each case via a horizontally adjustable rest 56. Thus, the first tensioning points 42 can be adjusted in the horizontal direction H with respect to the body 12, but are fixed in the vertical direction V.

Furthermore, one of the second tensioning points 46 of the second flexible guide 38 is fastened to the first bearing portion 28, while the other second tensioning point 46 is connected to the body 12 via a vertically adjustable rest 58, and can therefore be adjusted in the vertical direction V with respect to the body 12, but is fixed in the horizontal direction H.

Figure 3:
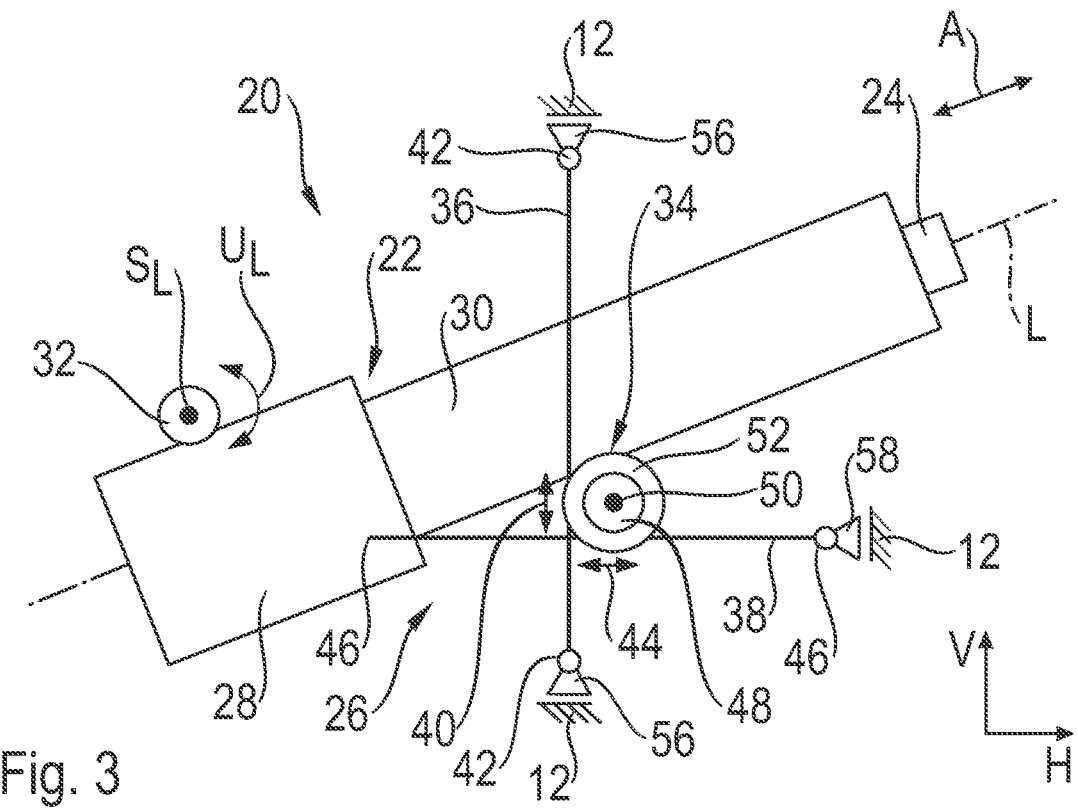
FIG. 3 shows a diagrammatic illustration of the steering column assembly from FIG. 1 in accordance with a further exemplary arrangement.
Figure 4:
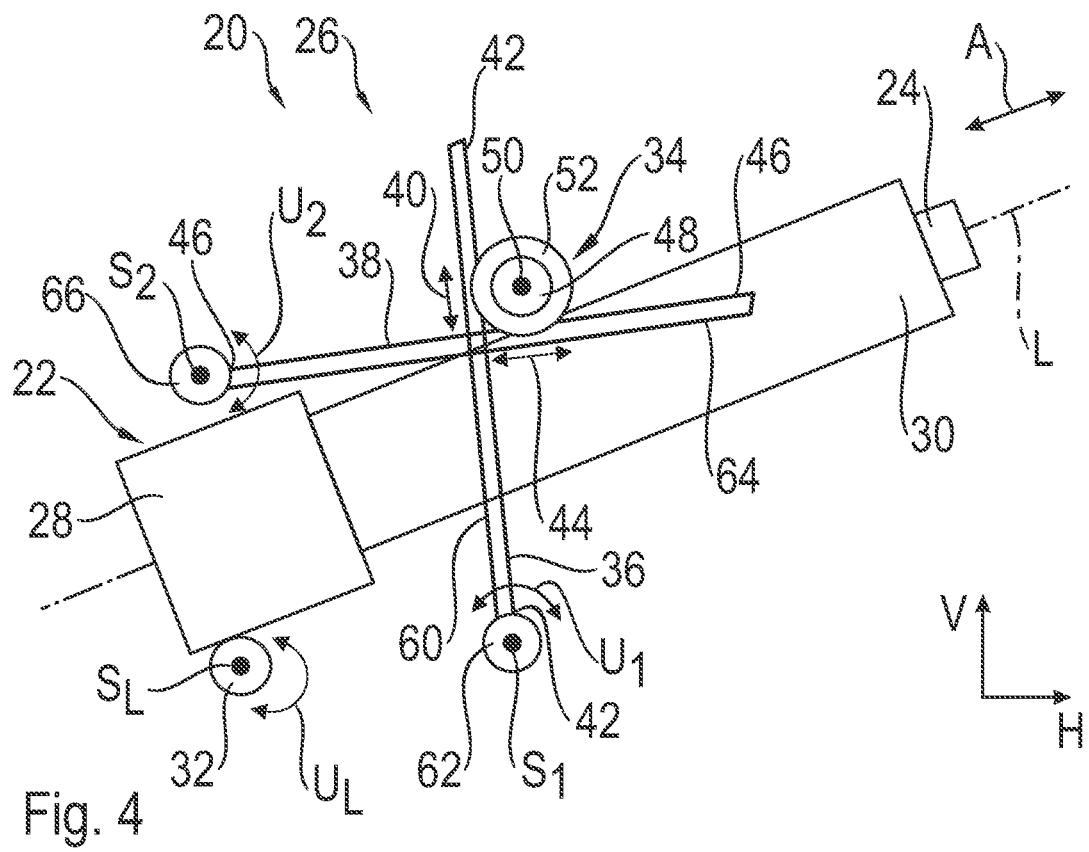
FIG. 4 shows a diagrammatic illustration of the steering column assembly from FIG. 1 in accordance with a further exemplary arrangement.

The rests 56 and 58 can correspondingly be dispensed with either for the horizontal or vertical adjustment from FIG. 3, as soon as one of the two is replaced by way of an adjusting variant from the exemplary arrangements of FIG. 2, 4 or 5.

In that position of the steering column assembly 20 which is shown in FIG. 3, the two second tensioning points 46 are situated at the same height in the vertical direction V, with the result that the second tensioning direction 44 extends in the horizontal direction H. In other positions of the steering column assembly 20, the second tensioning direction 44 differs correspondingly from the horizontal direction H.

As in the exemplary arrangement shown in FIG. 2, a rotation of the drive shaft 50 also leads here to a combined adjusting movement of the steering shaft 24, which combined adjusting movement can be decoupled in an analogous manner by a second drive or a drive 34 with two drive elements 52 which can be decoupled into an adjusting movement in the axial direction A and an adjusting movement in the circumferential direction $U_L$ about the pivot axis $S_L$.

A steering column assembly 20 in accordance with a further will now be described on the basis of FIG. 4. The same reference numerals are used for the components which are known from the above exemplary arrangements, and to this extent reference is made to the above explanations.

In contrast to the exemplary arrangement shown in FIG. 2, the motor 48 is fastened here to the second bearing portion 30 of the bearing housing 22.

Furthermore, the adjusting apparatus 26 has a first carrier 60 with a first carrier joint 62 and a second carrier 64 with a second carrier joint 66.

Here, the two first tensioning points 42 are provided on or attached to the first carrier 60, as a result of which the first flexible guide element 36 is clamped on the first carrier 60.

Here, the two second tensioning points 46 are provided on or attached to the second carrier 64, as a result of which the second flexible guide element 38 is clamped on the second carrier 64.

The first carrier 60 is attached to the body 12 such that it can be pivoted via the first carrier joint 62 about a first pivot axis $S_1$ in the circumferential direction $U_1$, while the second carrier 64 is attached to the body 12 such that it can be pivoted via the second carrier joint 66 about a second pivot axis $S_2$ in the circumferential direction $U_2$.

As in the preceding exemplary arrangements, a rotation of the drive shaft 50 leads here to a combined adjusting movement of the steering shaft 24, which combined adjusting movement can be decoupled in an analogous way by a second drive or a drive 34 with two drive elements 52 which can be decoupled into an adjusting movement in the axial direction A and an adjusting movement in the circumferential direction $U_L$ about the pivot axis $S_L$.

A steering column assembly 20 in accordance with a further exemplary arrangement will now be described on the basis of FIG. 5. The same reference numerals are used for the components which are known from the above exemplary arrangements, and to this extent reference is made to the above explanations.

In contrast to the exemplary arrangement shown in FIG. 4, the adjusting apparatus 26 has a second drive 68 with a second drive element 70.

In an analogous manner to the first drive 34, the second drive 68 has a second motor 72 with a second drive shaft 24 which forms the second drive element 70 or is coupled to the latter in a torque-transmitting manner.

The second motor 72 is an electric motor.

Here, the first drive 34 is coupled to the first flexible guide element 36 in a torque-transmitting manner, by the first drive element 52 being wrapped around at least once without play by the first flexible guide element 36, and the second drive 68 is coupled to the second flexible guide element 38 in a torque-transmitting manner, by the second drive element 70 being wrapped around at least once without play by the second flexible guide element 38.

As a result, depending on the rotational direction of the first drive shaft 50, the first drive 34 moves along the first flexible guide element 36 in or counter to the first tensioning direction 40, while, depending on the rotational direction of the second drive shaft 74, the second drive 68 moves along the second flexible guide element 38 in or counter to the second tensioning direction 44.

Furthermore, in contrast to the exemplary arrangement shown in FIG. 4, the first motor 48 and the second motor 72 are fastened in each case to the body 12, while the first carrier 60 and the second carrier 64 are attached in each case via the associated carrier joint 62, 66 to the second bearing portion 30 such that they can be pivoted about the corresponding pivot axis $S_1$, $S_2$.

In the exemplary arrangement shown in FIG. 5, the pivot axis $S_1$ and the pivot axis $S_2$ coincide, which can also be different, however. Here, the first carrier joint 62 and the second carrier joint 66 are arranged behind one another in the viewing direction perpendicularly with respect to the plane of the drawing.

As in the preceding exemplary arrangements, the steering shaft 24 can be adjusted by the adjusting apparatus 26 in the axial direction A and in the circumferential direction $U_L$ about the pivot axis $S_L$, by the drive shafts 50, 74 being driven.

In the case of the present exemplary arrangement with two separate drives 34, 68, the motors 48, 72 can be driven such that the adjusting movement in the axial direction A is decoupled from the adjusting movement in the circumferential direction $U_L$.

In this way, a steering column assembly 20 and a motor vehicle 10 with a steering column assembly 20 of this type are provided, by which the steering shaft 24 can be adjusted relative to the body 12 and can be adapted individually to the driver 16.

In principle, the drive 34, together with the coupled flexible guide element 36, 38, a type of linear drive with an adjusting direction which corresponds to the corresponding tensioning direction 40, 44 of the flexible guide element 36, 38.

Here, the adjusting apparatus 26 has the advantage that the drive element 52 is coupled without play to the flexible guide element 36, 38.

Furthermore, depending on the diameter of the drive element 52, only a comparatively small number of revolutions of the drive shaft 50 are required, in order to adjust the steering shaft 24 significantly, in particular in comparison with a drive with a threaded spindle.

As a result, the adjusting apparatus 26 is particularly smooth-running, and the steering column assembly 20 can be adjusted rapidly and effectively with low noise.

The disclosure is not restricted to the exemplary arrangement which are shown. In particular, individual features of one exemplary arrangement can be combined as desired with features of other exemplary arrangement, in particular independently of the other features of the corresponding exemplary arrangements.

For example, in one exemplary arrangement, the first flexible guide element 36 can be fastened via its first tensioning points 42 to the body 12, in particular by rests 56, 58, while the second flexible guide element 38 is fastened via its second tensioning points 46 to a carrier 60, 64 and is attached to the body 12 pivotably via the carrier joint 62, 66.

The invention claimed is:

1. A motor vehicle with a body and a steering column assembly, the steering column assembly including:
   a bearing housing and a steering shaft mounted rotatably in the bearing housing, and including an adjusting apparatus, by which the steering shaft is adjustable relative to the body of the motor vehicle,
   the adjusting apparatus having a drive with a drive element and a motor with a drive shaft that at least one of forms the drive element or is coupled to the drive element in a torque-transmitting manner,
   wherein the adjusting apparatus has a first flexible guide element,
   the first flexible guide element running in a tensioned manner between two first tensioning points, wherein the two first tensioning points of the first flexible guide element are attached to the body and wherein the first flexible guide element extends in a first tensioning direction from one of the first tensioning points to the other first tensioning point,
   the drive element wrapped around at least once without play by the first flexible guide element and being coupled to it in a torque-transmitting manner such that the drive moves along the first flexible guide element at least one of in or counter to the first tensioning direction when the drive shaft rotates,
   the adjusting apparatus coupled to the bearing housing in such a way that, when driven by the rotating drive shaft, the steering shaft is pivoted about a pivot axis with respect to the body or is adjusted in the axial direction of the steering shaft with respect to the body.

2. The steering column assembly according to claim 1, wherein the adjusting apparatus has a second flexible guide element, the second flexible guide element running in a tensioned manner between two second tensioning points and extending in a second tensioning direction from one of the second tensioning points to the other second tensioning point.

3. The steering column assembly according to claim 2, wherein the drive element is wrapped around at least once without play by the second flexible guide element and is coupled to it in a torque-transmitting manner such that the drive moves along the second flexible guide element in or counter to the second tensioning direction when the drive shaft rotates in or counter to a rotational direction.

4. The steering column assembly according to claim 2, wherein the adjusting apparatus has a second drive with a second drive element, the second drive having a second motor with a second drive shaft which forms the second drive element or is coupled to the second drive element in a torque-transmitting manner, the second drive element being wrapped around at least once without play by the second flexible guide element and being coupled to it in a torque-transmitting manner such that the second drive moves along the second flexible guide element in or counter to the second tensioning direction when the second drive shaft rotates in or counter to a second rotational direction.

5. The steering column assembly according to claim 1, wherein the first flexible guide element a cord, a wire, a cable, a strap, a belt or a ball chain.

6. The motor vehicle according to claim 1, wherein the steering column assembly has a steering column joint, by which the bearing housing is attached to the body such that it can be pivoted about a pivot axis.

7. The motor vehicle according to claim 1, wherein the first motor and/or the second motor are/is attached to the bearing housing.

8. The motor vehicle according to claim 1, wherein the first motor and/or the second motor are/is attached to the body.

9. The motor vehicle according to claim 1, wherein the motor is mounted such that the motor can be adjusted in the vertical direction with respect to the body, the steering column assembly having at least one supporting element which supports the motor in the vertical direction.

10. The motor vehicle according to claim 1, wherein two second tensioning points of a second flexible guide element are attached to the bearing housing, the bearing housing having a first bearing portion and a second bearing portion which can be adjusted telescopically with respect to one another in the axial direction of the steering shaft, the second tensioning points being attached to the first bearing portion or to the second bearing portion.

11. The motor vehicle according to claim 10, wherein the steering column assembly has a first carrier, which has the first tensioning points of the first flexible guide element, and/or a second carrier, which has the second tensioning points of the second flexible guide element, the steering column assembly having a first carrier joint, by which the first carrier is attached to the body or the bearing housing such that it can be pivoted about a pivot axis, and/or having a second carrier joint, by which the second carrier is attached to the body or the bearing housing such that it can be pivoted about a pivot axis.

12. The motor vehicle according to claim 10, wherein one of the second tensioning points of the second flexible guide element is attached to the bearing housing, and the other second tensioning point is attached to the body.

13. A steering column assembly for a motor vehicle, the steering column assembly comprising:
    a bearing housing and a steering shaft mounted rotatably in the bearing housing, and including an adjusting apparatus, by which the steering shaft is adjustable relative to the body of the motor vehicle,
    the adjusting apparatus having a drive with a drive element and a motor with a drive shaft that at least one of forms the drive element or is coupled to the drive element in a torque-transmitting manner,
    wherein the adjusting apparatus includes a first flexible guide element and a separate second flexible guide member,
    the first flexible guide element disposed in a tensioned manner between two first tensioning points and extending in a first tensioning direction from one of the first tensioning points to the other first tensioning point,
    the second flexible guide element running in a tensioned manner between two second tensioning points that are separate from the first tensioning points such that the second flexible guide element extends in a second tensioning direction from one of the second tensioning points to the other second tensioning point,
    the drive element wrapped around at least once by the first flexible guide element and being coupled to it in a torque-transmitting manner such that the drive moves along the first flexible guide element at least one of in or counter to the first tensioning direction when the drive shaft rotates,
    the adjusting apparatus coupled to the bearing housing in such a way that, when driven by the rotating drive shaft, the steering shaft is at least one of pivoted about a pivot axis with respect to the body or is adjusted in the axial direction of the steering shaft with respect to the body.

14. The steering column assembly according to claim 13, wherein the drive element is wrapped around at least once without play by the second flexible guide element and is coupled to it in a torque-transmitting manner such that the drive moves along the second guide element in or counter to the second tensioning direction when the drive shaft rotates in or counter to a rotational direction.

15. The steering column assembly according to claim 13, wherein the adjusting apparatus includes a second drive with a second drive element, the second drive having a second motor with a second drive shaft which forms the second drive element or is coupled to the second drive element in a torque-transmitting manner, the second drive element wrapped around at least once by the second flexible guide element and being coupled to it in a torque-transmitting manner such that the second drive moves along the second flexible guide element in or counter to the second tensioning direction when the second drive shaft rotates in or counter to a second rotational direction.

16. The steering column assembly according to claim 13, wherein the first flexible guide element comprises at least one of a cord, a wire, a cable, a strap, a belt, or a ball chain.

\* \* \* \* \*